(12) United States Patent
Bajko

(10) Patent No.: US 12,231,898 B2
(45) Date of Patent: Feb. 18, 2025

(54) SECURITY OF WI-FI PROTECTED SETUP PROCEDURE

(71) Applicant: MediaTek Singapore Pte. Ltd., Singapore (SG)

(72) Inventor: Gabor Bajko, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 203 days.

(21) Appl. No.: 17/874,035

(22) Filed: Jul. 26, 2022

(65) Prior Publication Data

US 2023/0059872 A1    Feb. 23, 2023

Related U.S. Application Data

(60) Provisional application No. 63/235,827, filed on Aug. 23, 2021.

(51) Int. Cl.
| | | |
|---|---|---|
| *H04W 12/50* | (2021.01) | |
| *H04W 12/06* | (2021.01) | |
| *H04W 12/121* | (2021.01) | |
| *H04W 12/61* | (2021.01) | |

(52) U.S. Cl.
CPC ......... *H04W 12/50* (2021.01); *H04W 12/068* (2021.01); *H04W 12/121* (2021.01); *H04W 12/61* (2021.01)

(58) Field of Classification Search
None
See application file for complete search history.

(56) References Cited

U.S. PATENT DOCUMENTS

| | | | | |
|---|---|---|---|---|
| 10,397,932 | B2 * | 8/2019 | Gonzalez Garrido | .. H04L 41/12 |
| 10,716,075 | B1 * | 7/2020 | Choi | ................... H04W 52/343 |
| 2006/0084460 | A1 * | 4/2006 | Matsuo | ............... H04W 52/267 |
| | | | | 455/522 |
| 2011/0176468 | A1 * | 7/2011 | Sridhara | ............... H04W 64/00 |
| | | | | 370/311 |
| 2013/0229930 | A1 | 9/2013 | Akay et al. | |
| 2016/0261601 | A1 | 9/2016 | Zhou et al. | |
| 2020/0084616 | A1 | 3/2020 | Parisot et al. | |

FOREIGN PATENT DOCUMENTS

| | | | |
|---|---|---|---|
| WO | WO 2019103823 | A1 | 5/2019 |
| WO | WO 2020176831 | A1 | 9/2020 |

OTHER PUBLICATIONS

European Patent Office, Extended European Search Report for European Patent Application No. 22191006.0, Feb. 21, 2023.
Taiwan Intellectual Property Office, Office Action for Taiwan Patent Application No. 111131419, Sep. 27, 2022.

(Continued)

*Primary Examiner* — Bradley W Holder
(74) *Attorney, Agent, or Firm* — Andy M. Han; Han IP PLLC

(57) ABSTRACT

Solutions pertaining to improvement in the security of a Wi-Fi Protected Setup (WPS) procedure are proposed. An access point (AP) determines that a WPS procedure is activated. In response, the AP varies a transmission (Tx) power in transmitting one or more WPS management frames during the WPS procedure. Moreover, the AP configures one or more credentials to a station (STA) in response to receiving one or more management frames from the STA.

3 Claims, 4 Drawing Sheets

WIRELESS COMMUNICATIONS WITH IMPROVEMENT IN SECURITY OF WI-FI PROTECTED SETUP (WPS) PROCEDURE

(56) References Cited

OTHER PUBLICATIONS

European Patent Office, Partial European Search Report for European Patent Application No. 22191006.0, Jan. 2, 2023.
European Patent Office, Extended European Search Report for European Patent Application No. 23171996.4, Aug. 3, 2023.
Domuta Ioan et al: "Two-Way Ranging Algorithms for Clock Error Compensation", IEEE Transactions on Vehicular Technology, IEEE, USA, vol. 70, No. 8, Jul. 14, 2021, pp. 8237-8250, XP011872489, ISSN: 0018-9545.

* cited by examiner

SECURITY OF WI-FI PROTECTED SETUP PROCEDURE

CROSS REFERENCE TO RELATED PATENT APPLICATION

The present disclosure claims the priority benefit of U.S. Provisional Patent Application No. 63/235,827, filed 23 Aug. 2021, the content of which being incorporated by reference in its entirety.

TECHNICAL FIELD

The present disclosure is generally related to Wi-Fi communications and, more particularly, to improvement in the security of a Wi-Fi Protected Setup (WPS) procedure.

BACKGROUND

Unless otherwise indicated herein, approaches described in this section are not prior art to the claims listed below and are not admitted as prior art by inclusion in this section.

In general, WPS refers to a network security standard with respect to creating a secure wireless home network. Put differently, WPS is a wireless router feature that is designed to simplify the process of setting up a secure wireless network. Rather than manually configuring security settings, a user can press a WPS button to create a secure wireless network. As a result, it is a common feature offered on many routers. When the WPS button is pressed, the router scans for nearby wireless devices. Next, the user can open the settings in the respective wireless devices to choose the wireless network. The devise would then automatically connect to the wireless network. With WPS, there is no need for the user to enter a password when connecting to the wireless network, thereby simplifying the process of setting up a secure wireless network. It is noteworthy that WPS only supports Wi-Fi Protected Access (WPA) Personal or WPA Personal encryption protocols. That is, a user cannot use this feature with the Wired Equivalent Privacy (WEP) encryption protocol.

However, there are some vulnerabilities in the existing WPS process or procedure. For instance, in cases where the WPS button on an access point (AP) or Registrar is pushed first to activate or otherwise initiate the WPS procedure, an attacker could listen to Beacon frames from the AP. Once Beacon(s) with WPS information element (IE) is/are detected, the attacker could go through WPS exchange immediately after the AP indicates that it has WPS Registrar enabled for push button configuration (PBC). The PBC allows a user to connect a wireless device to a wireless network by pressing both the WPS Settings menu on the control panel of the device and the WPS (PBC) button on a WPS-enabled AP (or wireless router), respectively. As long as the attacker completes the WPS procedure before a real Enrollee has had a chance to get its WPS button pushed and Probe Request frame out on the AP's operating channel, the attacker would succeed and thus could gain network credentials allowing the attacker to connect to the network (and, in case of WPA2-Personall, also allowing the attacker to decrypt all past traffic in the network).

Moreover, in case the WPS button is pressed first on the Enrollee, the attacker would need to bypass a PBC session overlap detection. Specifically, the attacker would observe both the Beacon frames from the AP and the Probe Request frames on the AP's operating channel. Once the attacker detects a Probe Request frame indicating readiness for PBC, the attacker could clone the medium access control (MAC) address and universally unique identifier (UUID) from that frame to use them to perform the WPS procedure with the AP as soon as the AP's WPS button is pushed.

Therefore, there is a need for a solution of improvement in the security of the WPS procedure.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure pertain to improvement in the security of the WPS procedure.

In one aspect, a method may involve determining that a WPS procedure is activated. The method may also involve varying a transmission (Tx) power in transmitting one or more WPS management frames during the WPS procedure.

In another aspect, a method may involve performing ranging prior to or during a WPS procedure. The method may also involve determining a distance between a first communication entity and a second communication entity based on a result of the ranging. The method may further involve configuring one or more credentials to the first communication entity responsive to the distance being determined to be less than a threshold. The method may further involve configuring one or more credentials to a first communication entity responsive to receiving one or more management frames from the first communication entity.

In yet another aspect, an apparatus may include a transceiver configured to communicate wirelessly. The apparatus may also include a processor coupled to the transceiver and configured to execute either or both of a first defense procedure and a second defense procedure during a WPS procedure to improve security of the WPS procedure. The first defense procedure may involve Tx power reduction, and the second defense procedure may involve ranging.

It is noteworthy that, although description provided herein may be in the context of certain radio access technologies, networks and network topologies such as Wi-Fi, the proposed concepts, schemes and any variation(s)/derivative(s) thereof may be implemented in, for and by other types of radio access technologies, networks and network topologies such as, for example and without limitation, Bluetooth, ZigBee, infrared, Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to improvement in the security of the WPS procedure. According to the present disclosure, a number of possible solutions may be implemented separately or jointly. That is, although these possible solutions may be described below separately, two or more of these possible solutions may be implemented in one combination or another.

As alluded to above, although it is convenient and easy to use, WPS tends to suffer from security flaws. The biggest problem is that the existing WPS procedure exposes all of the connected wireless devices. In case a hacker obtains access to a wireless device connected to a wireless network, the hacker could have unrestricted access to all the wireless devices on that network.

Figure 1:
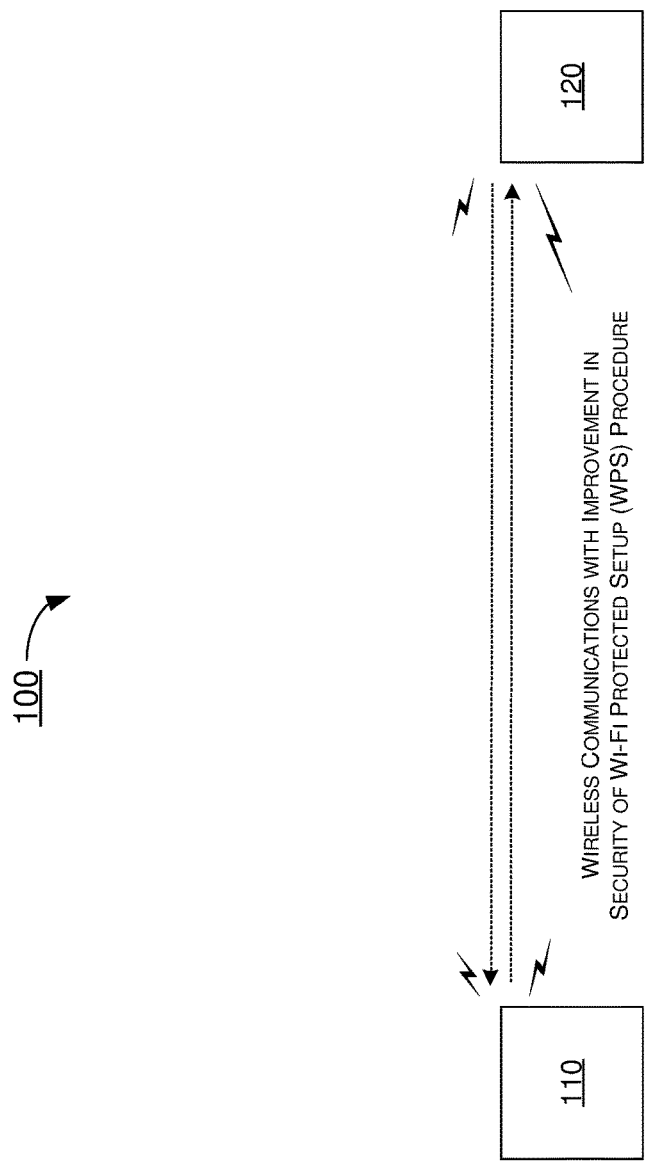
FIG. 1 is a diagram of an example network environment in which various proposed schemes in accordance with the present disclosure may be implemented.

Referring to FIG. 1, network environment 100 may involve a communication entity 110 (herein interchangeably referred to as "first communication entity") and a communication entity 120 (herein interchangeably referred to as "second communication entity") communicating wirelessly (e.g., in a WLAN in accordance with one or more Institute of Electrical and Electronics Engineers (IEEE) 802.11 standards). For instance, communication entity 110 may be a first station (STA) and communication entity 120 may be a second STA, with each of the first STA and second STA functioning either as an access point (AP) STA or as a non-AP STA. Under various proposed schemes in accordance with the present disclosure, communication entity 110 and communication entity 120 may be configured to implement improvement in the security of the WPS procedure. More specifically, communication entity 110 and communication entity 120 may be configured to implement one or more defense mechanisms to reduce or otherwise minimize the possibility of attackers exploiting WPS, as described below.

Under a first proposed scheme in accordance with the present disclosure, a first defense mechanism may involve Tx power reduction for WPS Management frames. In a first approach under the first proposed scheme, the Tx power of the devices may be varied once the WPS button is pushed (e.g., by a user) to activate or otherwise initiate a WPS procedure. For instance, a user may be instructed by a user's manual to place a to-be-onboarded (or to-be-connected) device next to an AP and then power on the device. Alternatively, or additionally, the user may push the WPS button on the AP first and then push the WPS button on the device to be onboarded, thereby causing the AP to start transmitting Beacon frames with a WPS IE. Under the proposed scheme, certain modifications may be made to existing implementations. For instance, Beacon frames with the WPS IE may be transmitted or sent by the AP in addition to regular Beacon frames. The Beacon frames with WPS IE may be transmitted at a much lower Tx power level so as to ensure that only device(s) in a very close proximity of the AP may hear those beacons. During a Monitor Time (e.g., 2 minutes after the WPS button is pushed), Authentication and Association frames transmitted by the AP may also be transmitted with a lower Tx power.

Under this proposed scheme, in case the user pushes the WPS button on the to-be-onboarded device first (despite the user's manual instructing otherwise), the to-be-onboarded device may start transmitting Probe Request frames with WPS readiness. In order to avoid snooping by an attacker, the to-be-onboarded device may also transmit its Probe Request frames at a reduced Tx power. After its WPS button is pushed, the AP may respond with Probe Response frames with a reduced Tx power. Moreover, during the Monitor Time (e.g., 2 minutes after the WPS button is pushed), the AP may transmit the Authentication and Association frames with a lower Tx power.

In a second approach under the first proposed scheme, by transmitting Management frames at a reduced Tx power, the AP may ensure that only devices in close proximity may receive those Management frames and proceed with the WPS procedure. Example types of the Management frames may include, for example and without limitation, Association Request frame(s), Reassociation Request frame(s), Probe Request frame(s), Timing Advertisement frame(s), Beacon frame(s), Disassociation frame(s), De-authentication frame(s), Authentication frame(s), Action frame(s), Association Response frame(s), Reassociation Response frame(s), and Probe Response frame(s).

Under a second proposed scheme in accordance with the present disclosure, a second defense mechanism may involve ranging. Under the proposed scheme, prior to or during the WPS procedure (but before configuring the credentials to the to-be-onboarded device), the AP may perform ranging with the device. For instance, ranging may be passive and the AP may only proceed with configuring credentials to a given to-be-onboarded device in an event that a result of the ranging operation indicates that the to-be-onboarded device is in close proximity of the AP. One example of passive ranging may be Received Signal Strength Indicator (RSSI) monitoring. For instance, the AP may be configured with a policy to only provide password to a to-be-onboarded device in response to that device being within 5 meters or less from the AP based on a result of RSSI monitoring.

Alternatively, active ranging may be utilized when the to-be-onboarded device supports Wi-Fi Location (e.g., Fine Time Measurement (FTM)-based ranging). For instance, FTM frames may be exchanged either pre-association or post-association to measure a distance between the AP and each to-be-onboarded device. Similarly, the AP may only proceed with configuring credentials to a given to-be-onboarded device in an event that the FTM exchange results in the conclusion that the to-be-onboarded device is in close proximity of the AP. For instance, the AP may be configured with a policy to only provide password to a to-be-onboarded device in response to that device being within 1 meter, 5 meters, or 10 meters from the AP based on a result of active ranging (e.g., FTM-based ranging).

Alternatively, the AP may perform active or passive ranging based on variable measurement result(s) indicating that the Enrollee is in motion (e.g., manually waving the Enrollee to be configured until it is configured). For instance, the to-be-onboarded device may be moving and not stationary. Accordingly, the AP may alternate between passive ranging and active ranging in implementing the second defense mechanism under this proposed scheme.

Illustrative Implementations

Figure 2:
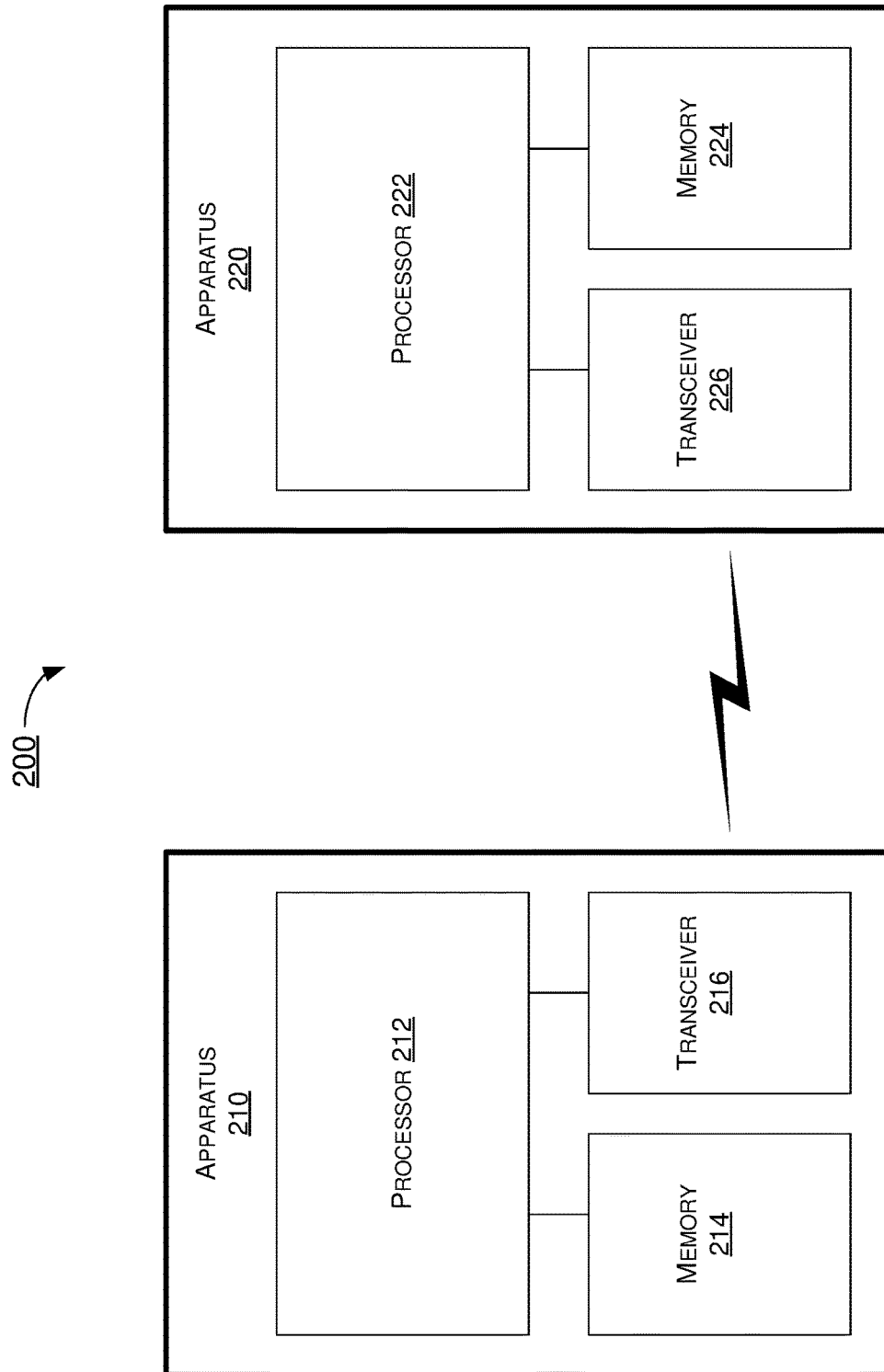
FIG. 2 is a block diagram of an example communication system in accordance with an implementation of the present disclosure.

FIG. 2 illustrates an example communication system 200 having an example apparatus 210 and an example apparatus 220 in accordance with an implementation of the present disclosure. Each of apparatus 210 and apparatus 220 may perform various functions to implement schemes, techniques, processes and methods described herein pertaining to improvement in the security of the WPS procedure, including scenarios/schemes described above as well as process(es) described below.

Each of apparatus 210 and apparatus 220 may be a part of an electronic apparatus, which may be a user equipment (UE) such as a portable or mobile apparatus, a wearable apparatus, a wireless communication apparatus or a computing apparatus. For instance, each of apparatus 210 and apparatus 220 may be implemented in a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be a STA such as an AP STA or a non-AP STA. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, one or more RISC processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including improvement in the security of the WPS procedure in accordance with various implementations of the present disclosure.

In some implementations, apparatus 210 may also include a transceiver 216 coupled to processor 212 and capable of wirelessly transmitting and receiving data. In some implementations, apparatus 210 may further include a memory 214 coupled to processor 212 and capable of being accessed by processor 212 and storing data therein. In some implementations, apparatus 220 may also include a transceiver 226 coupled to processor 222 and capable of wirelessly transmitting and receiving data. In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

Each of apparatus 210 and apparatus 220 may be a communication entity capable of communicating with each other using various proposed schemes in accordance with the present disclosure. For instance, apparatus 210 may be an example implementation of communication entity 110 (or the first communication entity) and apparatus 220 may be an example implementation of communication entity 120 (or the second communication entity) in network environment 100. To aid better understanding, the following description of the operations, functionalities and capabilities of each of apparatus 210 and apparatus 220 is provided in the context of a wireless communication environment in which apparatus 210 is implemented in or as a communication apparatus or a to-be-onboarded device and apparatus 220 is implemented in or as an AP or wireless router of a communication network (e.g., a Wi-Fi network). Under various proposed schemes in accordance with the present disclosure, processor 222 of apparatus 220 may be configured to execute either or both of a first defense procedure and a second defense procedure during a WPS procedure to improve security of the WPS procedure, with the first defense procedure involving Tx power reduction and the second defense procedure involving ranging. It is also noteworthy that, although the example implementations described below are provided in the context of mobile communications, the same may be implemented in other types of networks.

In one aspect under some proposed schemes pertaining to improvement in the security of the WPS procedure in accordance with the present disclosure, with apparatus 210 implemented in or as a to-be-onboarded device and apparatus 220 implemented in or as an AP or wireless router of a wireless network (e.g., a Wi-Fi network or otherwise a wireless local area network (WLAN)), processor 222 may determine that a WPS procedure is activated or otherwise initiated (e.g., due to a WPS on apparatus 220 being pushed by a user). Moreover, processor 222 may vary, via transceiver 216, a Tx power in transmitting one or more WPS management frames to apparatus 210 during the WPS procedure. Furthermore, processor 222 may configure one or more credentials to apparatus 210 responsive to receiving one or more management frames from apparatus 210.

In some implementations, in varying the Tx power in transmitting the one or more WPS management frames during the WPS procedure, processor 222 may perform certain operations. For instance, processor 222 may transmit or broadcast one or more regular Beacon frames at a first power level. Additionally, processor 222 may transmit or broadcast one or more Beacon frames with a WPS IE at a second power level lower than the first power level. Moreover, processor 222 may transmit one or more Authentication frames and one or more Association frames (e.g., to apparatus 210) at the second power level lower or a third power level lower than the first power level.

In some implementations, in varying the Tx power in transmitting the one or more WPS management frames during the WPS procedure, processor 222 may perform other operations. For instance, processor 222 may receive one or more Probe Request frames from apparatus 210 at a first reduced power level. Moreover, processor 222 may transmit one or more Probe Response frames to apparatus 210 at a second reduced power level responsive to receiving the one or more Probe Request frames. In such cases, each of the first reduced power level and the second reduced power level may be lower than a regular power level used when the WPS procedure is not activated. Furthermore, processor 222 may transmit one or more Authentication frames and one or more Association frames to apparatus 210 at the second reduced power level lower or a third reduced power level. In such cases, the third reduced power level may also be lower than the regular power level.

In another aspect under some proposed schemes pertaining to improvement in the security of the WPS procedure in accordance with the present disclosure, with apparatus 210 implemented in or as a to-be-onboarded device and apparatus 220 implemented in or as an AP or wireless router of a wireless network (e.g., a Wi-Fi network or otherwise a WLAN), processor 222 may perform ranging prior to or during a WPS procedure. Additionally, processor 222 may determine a distance between apparatus 210 and apparatus 220 based on a result of the ranging. Furthermore, processor 222 may configure one or more credentials to apparatus 210 responsive to the distance being determined to be less than a threshold (e.g., 1 meter, 5 meter, 10 meter or another threshold value).

In some implementations, in performing the ranging, processor 222 may perform passive ranging. In some implementations, in performing the passive ranging, processor 222 may perform RSSI monitoring.

In some implementations, in performing the ranging, processor 222 may perform active ranging. In some implementations, in performing the active ranging, processor 222 may perform FTM-based ranging by exchanging FTM frames either pre-association or post-association to measure the distance. In some implementations, in performing the FTM-based ranging, processor 222 may exchange FTM frames with apparatus 210 either pre-association or post-association to measure the distance.

In some implementations, in performing the ranging, processor 222 may alternate between passive ranging and active ranging responsive to a relative movement between apparatus 210 and apparatus 220.

Illustrative Processes

Figure 3:
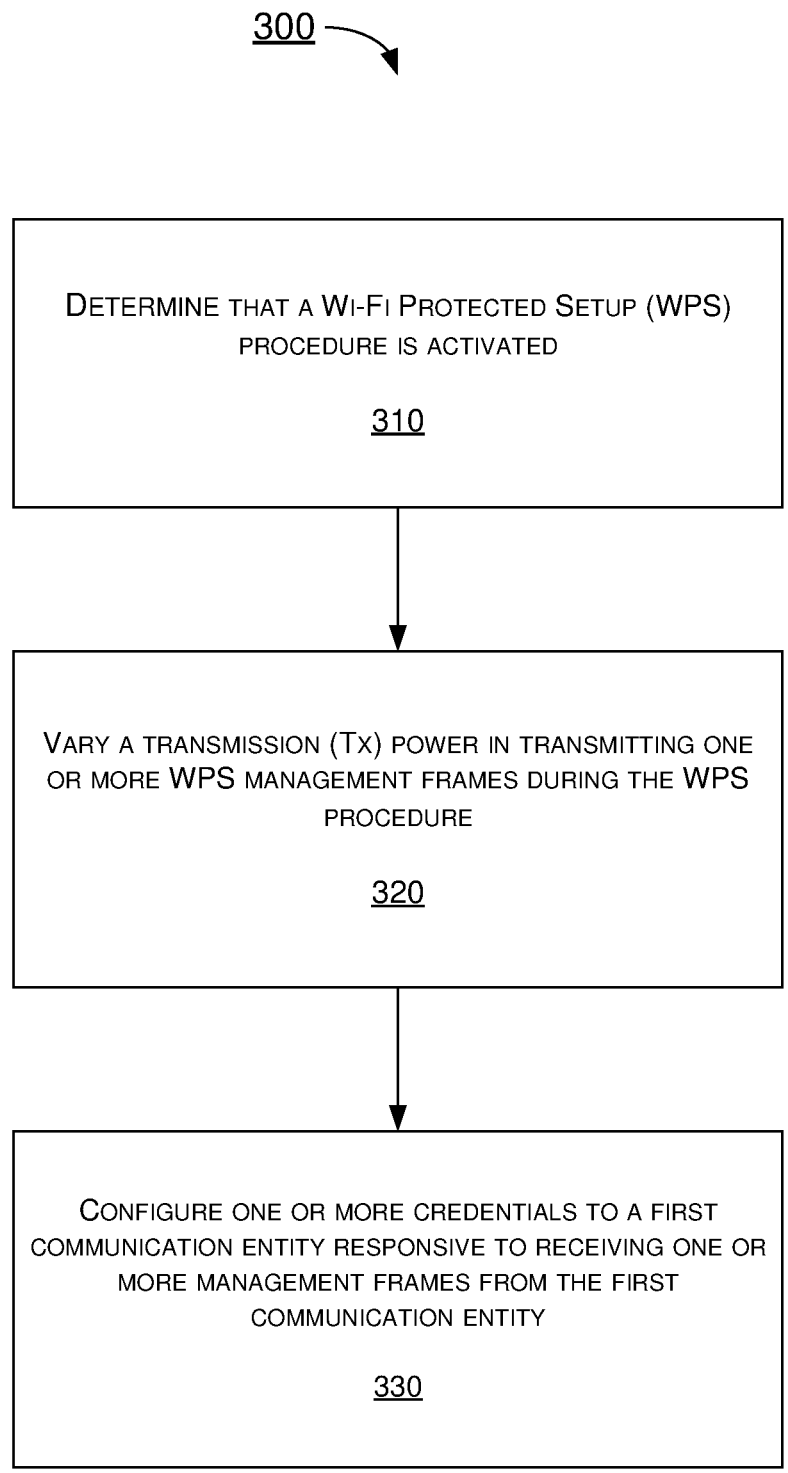
FIG. 3 is a flowchart of an example process in accordance with an implementation of the present disclosure.

FIG. 3 illustrates an example process 300 in accordance with an implementation of the present disclosure. Process 300 may be an example implementation of schemes described above whether partially or completely, with respect to improvement in the security of the WPS procedure in accordance with the present disclosure. Process 300 may represent an aspect of implementation of features of apparatus 210 and/or apparatus 220. Process 300 may include one or more operations, actions, or functions as illustrated by blocks 310, 320 and 330. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by apparatus 210 and apparatus 220. Solely for illustrative purposes and without limitation, process 300 is described below in the context of apparatus 210 implemented in or as a to-be-onboarded device and apparatus 220 implemented in or as an AP or wireless router of a wireless network. Process 300 may begin at block 310.

At 310, process 300 may involve processor 222 of apparatus 220, as an AP or wireless router, determining that a WPS procedure is activated or otherwise initiated (e.g., due to a WPS on apparatus 220 being pushed by a user). Process 300 may proceed from 310 to 320.

At 320, process 300 may involve processor 222 varying, via transceiver 216, a Tx power in transmitting one or more WPS management frames to apparatus 210, as a to-be-onboarded device, during the WPS procedure. Process 300 may proceed from 320 to 330.

At 330, process 300 may involve processor 222 configuring one or more credentials to a first communication entity (e.g., apparatus 210) responsive to receiving one or more management frames from the first communication entity.

In some implementations, in varying the Tx power in transmitting the one or more WPS management frames during the WPS procedure, process 300 may involve processor 222 performing certain operations. For instance, process 300 may involve processor 222 transmitting or broadcasting one or more regular Beacon frames at a first power level. Additionally, process 300 may involve processor 222 transmitting or broadcasting one or more Beacon frames with a WPS IE at a second power level lower than the first power level. Moreover, process 300 may involve processor 222 transmitting one or more Authentication frames and one or more Association frames (e.g., to apparatus 210) at the second power level lower or a third power level lower than the first power level.

In some implementations, in varying the Tx power in transmitting the one or more WPS management frames during the WPS procedure, process 300 may involve processor 222 performing other operations. For instance, process 300 may involve processor 222 receiving one or more Probe Request frames from apparatus 210 at a first reduced power level. Moreover, process 300 may involve processor 222 transmitting one or more Probe Response frames to apparatus 210 at a second reduced power level responsive to receiving the one or more Probe Request frames. In such cases, each of the first reduced power level and the second reduced power level may be lower than a regular power level used when the WPS procedure is not activated. Furthermore, process 300 may involve processor 222 transmitting one or more Authentication frames and one or more Association frames to apparatus 210 at the second reduced power level lower or a third reduced power level. In such cases, the third reduced power level may also be lower than the regular power level.

Figure 4:
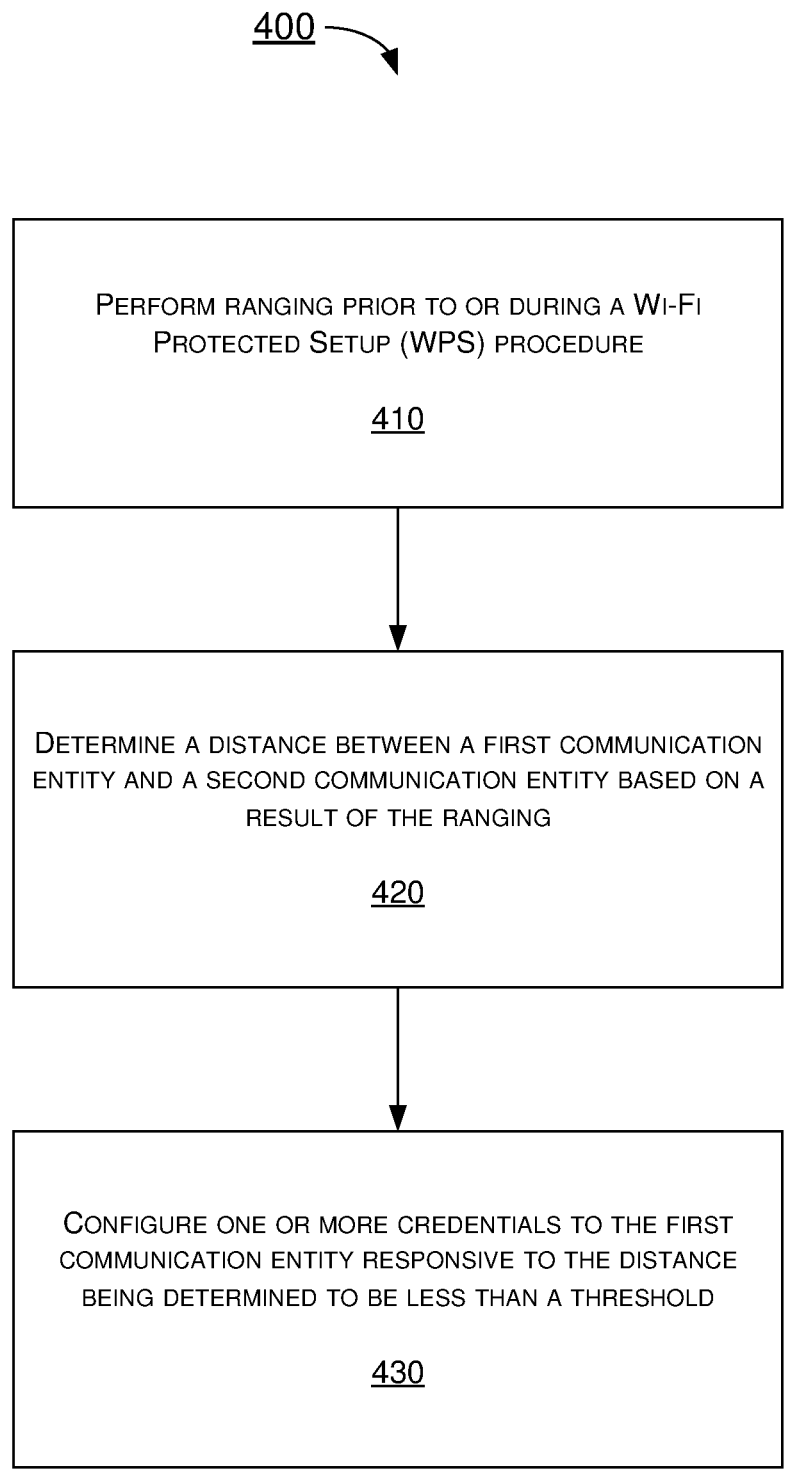
FIG. 4 is a flowchart of an example process in accordance with an implementation of the present disclosure.

FIG. 4 illustrates an example process 400 in accordance with an implementation of the present disclosure. Process 400 may be an example implementation of schemes described above whether partially or completely, with respect to improvement in the security of the WPS procedure in accordance with the present disclosure. Process 400 may represent an aspect of implementation of features of apparatus 210 and/or apparatus 220. Process 400 may include one or more operations, actions, or functions as illustrated by blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by apparatus 210 and apparatus 220. Solely for illustrative purposes and without limitation, process 400 is described below in the context of apparatus 210 implemented in or as a to-be-onboarded device and apparatus 220 implemented in or as an AP or wireless router of a wireless network. Process 400 may begin at block 410.

At 410, process 400 may involve processor 222 of apparatus 220, as an AP or wireless router, performing ranging prior to or during a WPS procedure. Process 400 may proceed from 410 to 420.

At 420, process 400 may involve processor 222 determining a distance between apparatus 210, as a to-be-onboarded device, and apparatus 220 based on a result of the ranging. Process 400 may proceed from 420 to 430.

At 430, process 400 may involve processor 222 configuring one or more credentials to apparatus 210 responsive to the distance being determined to be less than a threshold (e.g., 1 meter, 5 meter, 10 meter or another threshold value).

In some implementations, in performing the ranging, process 400 may involve processor 222 performing passive ranging. In some implementations, in performing the passive ranging, process 400 may involve processor 222 performing RSSI monitoring.

In some implementations, in performing the ranging, process 400 may involve processor 222 performing active ranging. In some implementations, in performing the active ranging, process 400 may involve processor 222 performing FTM-based ranging by exchanging FTM frames either pre-association or post-association to measure the distance. In some implementations, in performing the FTM-based ranging, process 400 may involve processor 222 exchanging FTM frames with apparatus 210 either pre-association or post-association to measure the distance.

In some implementations, in performing the ranging, process 400 may involve processor 222 alternating between passive ranging and active ranging responsive to a relative movement between apparatus 210 and apparatus 220.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining that a Wi-Fi Protected Setup (WPS) procedure is activated;
   varying a transmission (Tx) power in transmitting one or more WPS management frames during the WPS procedure; and
   configuring one or more credentials to a first communication entity responsive to receiving one or more management frames from the first communication entity,
   wherein the varying of the Tx power in transmitting the one or more WPS management frames during the WPS procedure comprises:
      transmitting one or more regular Beacon frames at a first power level; and
      transmitting one or more Beacon frames with a WPS information element (IE) at a second power level lower than the first power level; and
   transmitting one or more Authentication frames and one or more Association frames at the second power level lower or a third power level lower than the first power level.

2. A method, comprising:
   determining that a Wi-Fi Protected Setup (WPS) procedure is activated;
   varying a transmission (Tx) power in transmitting one or more WPS management frames during the WPS procedure; and
   configuring one or more credentials to a first communication entity responsive to receiving one or more management frames from the first communication entity,
   wherein the varying of the Tx power in transmitting the one or more WPS management frames during the WPS procedure comprises:
      receiving one or more Probe Request frames at a first reduced power level;
      transmitting one or more Probe Response frames at a second reduced power level responsive to receiving the one or more Probe Request frames; and
      transmitting one or more Authentication frames and one or more Association frames at the second reduced power level lower or a third reduced power level,
   wherein each of the first reduced power level and the second reduced power level is lower than a regular power level used when the WPS procedure is not activated, and wherein the third reduced power level is lower than the regular power level.

3. An apparatus, comprising:
   a transceiver configured to communicate wirelessly; and
   a processor coupled to the transceiver and configured to perform operations comprising:
      determining that a Wi-Fi Protected Setup (WPS) procedure is activated;
      varying a transmission (Tx) power in transmitting one or more WPS management frames during the WPS procedure; and
      configuring one or more credentials to a first communication entity responsive to receiving one or more management frames from the first communication entity,
      wherein the varying of the Tx power in transmitting the one or more WPS management frames during the WPS procedure comprises:
         transmitting one or more regular Beacon frames at a first power level; and
         transmitting one or more Beacon frames with a WPS information element (IE) at a second power level lower than the first power level; and
   transmitting one or more Authentication frames and one or more Association frames at the second power level lower or a third power level lower than the first power level.

* * * * *